United States Patent [19]

Nakamatsu et al.

[11] Patent Number: 4,690,686
[45] Date of Patent: Sep. 1, 1987

[54] LIGHT-FAST YELLOW DISPERSE DYE COMPOSITION FOR POLYESTER

[75] Inventors: Toshio Nakamatsu, Ibaraki; Yoshikazu Matsuo, Sakai; Masao Nishikuri, Hirakata; Kunihiko Imada, Sakai, all of Japan

[73] Assignee: Sumitomo Chemical Company, Limited, Osaka, Japan

[21] Appl. No.: 882,714

[22] Filed: Jul. 7, 1986

[30] Foreign Application Priority Data

Jul. 9, 1985 [JP] Japan .................................. 60-151035

[51] Int. Cl.$^4$ .......................... C09B 1/00; C09B 29/00
[52] U.S. Cl. ............................................ 8/638; 8/677; 8/690; 8/695; 8/696; 8/922
[58] Field of Search ............................. 8/638, 677, 690

[56] References Cited

U.S. PATENT DOCUMENTS 2,006,022 6/1935 Kranzlein et al. .................. 546/154

OTHER PUBLICATIONS

N. R. Ayyangar et al., Indian Journal of Chemistry, 1978, 16B, (11), (7) pp. 1007–1008, pp. 555–558.

*Primary Examiner*—A. Lionel Clingman
*Attorney, Agent, or Firm*—Stevens, Davis, Miller & Mosher

[57] ABSTRACT

A water-insoluble disperse dye composition comprising a combination of a dye represented by the following formula (I),

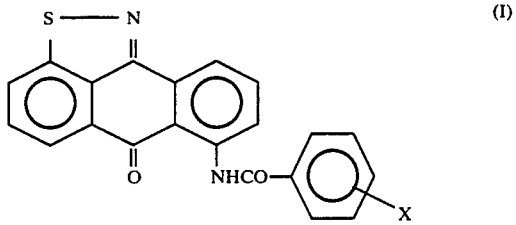

wherein X is hydrogen, halogen, lower alkyl or lower alkoxy, in an amount of 95 to 20% by weight, and a dye represented by the following formula (II),

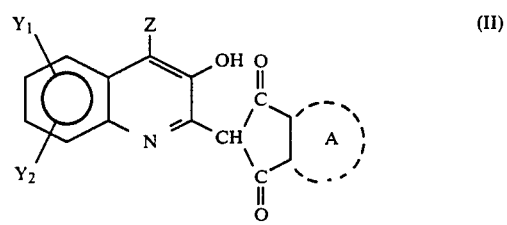

wherein Z, $Y_1$ and $Y_2$ are independently hydrogen or halogen, and the ring A is a benzene or naphthalene ring unsubstituted or substituted with a carboxylic acid ester group, in an amount of 5 to 80% by weight, which is useful for dyeing polyester fiber materials to obtain dyed products having both extremely high light fastness and excellent thermal resistance.

5 Claims, No Drawings

LIGHT-FAST YELLOW DISPERSE DYE COMPOSITION FOR POLYESTER

The present invention relates to a water-insoluble disperse dye composition.

More specifically, the present invention relates to a water-insoluble disperse dyed composition useful for dyeing fiber materials to obtain dyed products having extremely high light fastness.

Recently, polyester fiber materials have been used increasingly as materials for car interior because of their excellent heat and light resisting properities. With the increasing use, disperse dyes to be used for dyeing the polyester fiber materials have been required to have much excellent light fastness, particularly at a high temperature. In general, the fastness test to light is carried out according to JIS L-0842 in a manner such that a dyed product is exposed to carbon arc lump for 10 to 80 hours at a temperature of 63±3° C. While, in order to be used for the car interior, the dyed products are required to be resistant against exposure of carbon arc lump for 400 to 600 hours at a temperature as high as 83±3° C. Moreover, when used for car seats, the dyed polyester materials are put on urethane foam of a regeneration property, and therefore it is not seldom to allow the materials to stand at a temperature higher than 83±3° C. For these reasons, the disperse dyes have been required to be resistant against much severe conditions.

As yellow dyes having excellent light fastness usable for the utilities described above, the following two compounds are known. One of them is represented by the following formula (a),

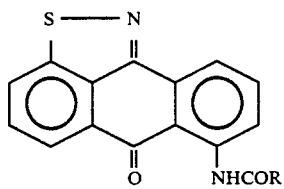

wherein R is a lower alkyl group, and the other is represented by the following formula (b),

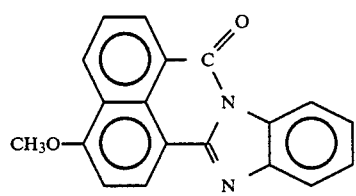

Generally speaking, in order to obtain a desired color shade, two or more dyes of colors different from each other are blended. When each of yellow dyes described above is used for dyeing polyester fiber materials in combination with another dye such as a red dye, a blue dye or a mixture thereof, a color shade obtained greatly changes after a processing such as heat set treatment. This is because of their extremely poor thermal resistance, by which many problems have often been caused on a practical use. Accordingly, a yellow disperse dye having both extremely high light fastness and excellent thermal resistance has been desired particularly in the field of car interior.

The present inventors have undertaken extensive studies to find such yellow dye, and as a result found that a combination of specific yellow dyes can accomplish the object.

The present invention provides a water-insoluble disperse dye composition comprising a combination of a dye represented by the following formula (I),

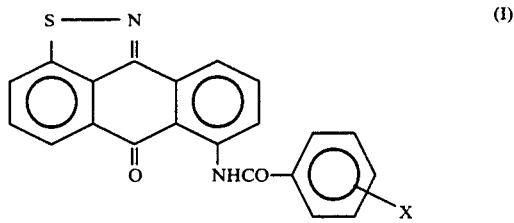

wherein X is hydrogen, halogen, $C_1$-$C_4$ alkyl or $C_1$-$C_4$ alkoxy, in an amount of 95 to 20% by weight, and a dye represented by the following formula (II),

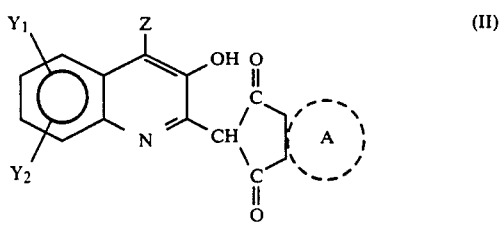

wherein Z, $Y_1$ and $Y_2$ are independently hydrogen or halogen, and the ring A is a benzene or naphthalene ring unsubstituted or substituted with a carboxylic acid ester group, in an amount of 5 to 80% by weight.

The dye of the formula (I) is favorable in light fastness and thermal resistance, but inferior in exhaustion and build-up properties, by which problems have been caused on a practical use, and the dye of the formula (II) is insufficient in light fastness at a high temperature, so that it is hardly used for dyeing polyester fibers to obtain dyed products of extremely high light fastness enough to be applied for car interior.

Notwithstanding such defects of the dyes (I) and (II), a combination of them can exhibit extremely high light fastness and excellent thermal resistance as well as excellent exhaustion and build-up properties.

The dye of the formula (I) can be produced, for example, by reacting a compound of the following formula,

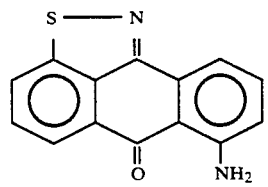

with a compound of the following formula,

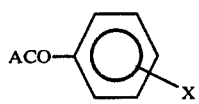

wherein X is as defined above, and A is a halogen, at a temperature of 50° to 150° C. in an inert solvent.

The dye of the formula (II) can be produced, for example, by reacting a compound of the following formula,

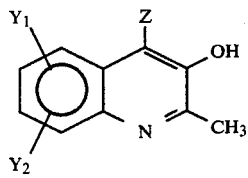

wherein $Y_1$ and $Y_2$ are as defined above, with a compound of the following formula,

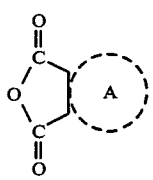

wherein A is as defined above, at a temperature of 150° to 250° C. in an inert solvent, if desired, followed by halogenation.

Of these compounds, preferably used are those of the following formula,

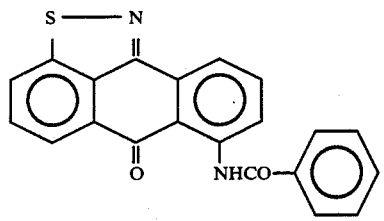

of the following formula,

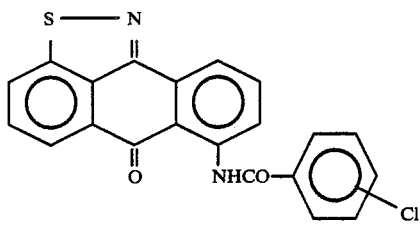

and of the following formula,

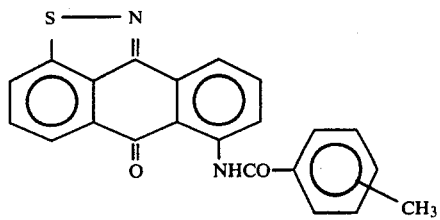

which are included in the formula (I), and used each alone or in a mixture thereof, and those of the following formula,

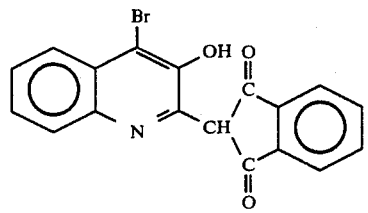

of the following formula,

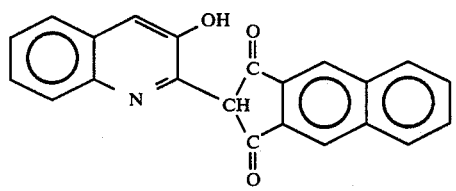

of the following formula,

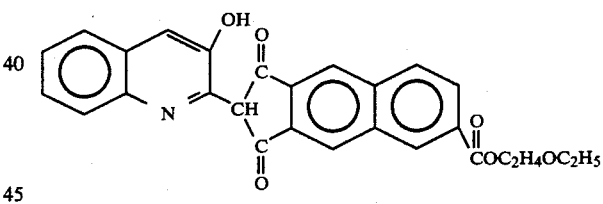

of the following formula,

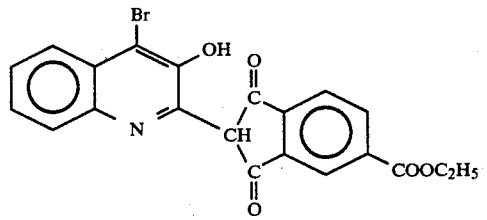

and of the following formula,

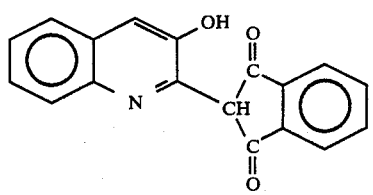

which are included in the formula (II), and used each alone or a mixture thereof.

The dye composition of the present invention can be prepared by mixing or blending the dye of the formula (II) with the dye of the formula (I) at any time before a step for making a final product.

A weight ratio in the dye composition of the present invention is 95 to 20, preferbly 90 to 50, of the dye (I), to 5 to 80, preferably 10 to 50 of the dye (II).

The present dye composition may comprise usual additives such as ultraviolet ray absorbents. Examples of the ultraviolet ray absrobents are as follows:

2-(2'-Hydroxyphenyl)-5-chloro-benzotriazole
2-(2'-Hydroxy-4'-methylphenyl)-5-chloro-benzotriazole
2-(2'-Hydroxy-4'-ethylphenyl)-5-chloro-benzotriazole
2-(2'-Hydroxy-3'-t-butyl-5'-methylphenyl)-5-chlorobenzotriazole
2-(2'-Hydroxy-3',5'-di-t-butylphenyl)-5-chloro-benzotriazole
2-(2',4'-Dihydroxyphenyl)-5-chloro-benzotriazole
2-(2'-Hydroxy-4'-propylphenyl)-5-chloro-benzotriazole
2-(2'-Hydroxy-4'-methoxyphenyl)-5-chloro-benzotriazole
2-(2'-Hydroxy-4'-ethoxyphenyl)-5-chloro-benzotriazole
2-(2'-Hydroxy-4'-propoxyphenyl)-5-chloro-benzotriazole
2-(2'-Hydroxy-5'-methylphenyl)-5-chloro-benzotriazole
2-(2'-Hydroxy-5'-ethylphenyl)-5-chloro-benzotriazole
2-(2'-Hydroxy-5'-propylphenyl)-5-chloro-benzotriazole The ultraviolet ray absorbents may be used alone or in a mixture of two or more, and they may be added to a dye bath together with the dye composition of the present invention. In this case, the amount thereof is not particularly limited and usually from 0.5 to 5% by weight based on the weight of the materials to be dyed.

In the present invention, the dyeing of polyester fiber materials can be carried out by a conventional exhaustion dyeing, printing or continuous dyeing method. In carrying out the exhaustion dyeing, a dye bath is prepared by dispersing a predetermined amount of the dye composition of the present invention in an aqueous medium, if desired together with the ultraviolet ray absorbent, and then adjusting the pH within a range of 4 to 5 using acetic acid or an aqueous buffer solution comprising, for example, acetic acid and sodium acetate. If desired, some quantity of a sequestering agent, a level dyeing agent of the like may be added thereto. To the dye bath prepared, fiber materials to be dyed are added, and the bath is heated gradually (for example, at a rate of 1° to 3° C. per minute). Dyeing can be continued at a predetermined temperature of higher than 100° C. (for example, 110° to 135° C.) for 30 to 60 minutes. The dyeing time may be shortened depending on the dyeing state. After the dyeing is over, the bath is cooled. The dyed materials can be finished in a conventional manner, for example, washed with water, if desired subjected to reduction clearing, followed by washing with water, and then dried. The dye composition of the present invention may be used alone or in a mixture thereof with other color dyes such as red dyes and blue dyes. In the above exhaustion dyeing, the present dye composition can exhibit an excellent exhaustion dyeing property.

The present invention is illustrated in more detail with reference to the following Examples and Comparative Examples, wherein parts and % are by weight.

EXAMPLE 1

88 Parts of a yellow disperse dye which has been prepared by finely pulverizing a mixture of 30% of a dye of the following formula (1),

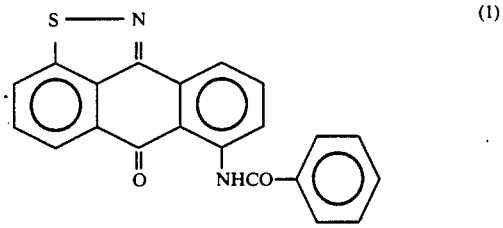

and 70% of an anionic surfactant in an aqueous medium, and then drying the resultant, and 12 parts of a yellow disperse dye which has been prepared by finely pulverizing a mixture of 30% of a dye of the following formula (2),

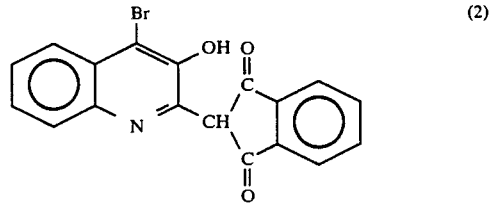

and 70% of an anionic surfactant in an aqueous medium, and then drying the resulting aqueous dispersion, were mixed with each other to obtain 100% parts of a yellow disperse dye composition.

1000 Parts of a dye bath of the dye dispersion containing 1.0 part of the yellow disperse dye composition was prepared and adjusted to pH 5 using acetic acid and sodium acetate. To the dye bath was added 100 parts of polyester raising textile fabric. The temperature was raised to 60° C., and subsequently raised up to 130° C. at a rate of 1° C. per minute. Dyeing was continued for 60 minutes at 130° C., and then the fabric was subjected to reduction clearing in a conventional manner, and dried to obtain a dyed product of a yellow color.

COMPARATIVE EXAMPLE 1

Using 1.0 part of a yellow disperse dye which has been prepared by finely pulverizing a mixture of 30% of the dye of the aforesaid formula (b) and 30% of an anionic surfactant in an aqueous medium, and then drying the resulting aqueous dispersion, dyeing was carried out in the same manner as in Example 1 to obtain a dyed product of a yellow color.

COMPARATIVE EXAMPLES 2 and 3

Using each of the yellow disperse dyes (1) and (2) in each amount of 1.0 part, dyeing was carried out in the same manner as in Example 1 to obtain each dyed product of a yellow color.

COMPARATIVE EXAMPLE 4

Using 1.0 part of a yellow disperse dye which has been prepared by finely pulverizing a mixture of 30% of a dye represented by the following formula (c),

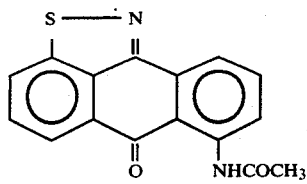

(c)

dyeing was carried out in the same manner as in Example 1 to obtain a dyed product of a yellow color.

The exhaustion property of the present dye composition used in Example 1 and the disperse dyes used in Comparative Examples 1, 2, 3 and 4 was observed visually, and the dyed products obtained in Example 1 and Comparative Examples 1, 2, 3, and 4 were measured for their light fastness and sublimation fastness. The results obtained are as shown in Table 1, which demonstrates that the dye composition and the dyed product obtained in Example 1 are superior to those in Comparative Examples 1, 2, 3 and 4 in the exhaustion property, and fastness properties to light and sublimation, respectively.

TABLE 1

|  | Exhaustion property | Light fastness (grade) | Sublimation fastness (grade) |
| --- | --- | --- | --- |
| Example 1 | O | 3–4 | 3–4 |
| Comparative Example 1 | O | 3–4 | 1–2 |
| Comparative Example 2 | X | 3–4 | 3–4 |
| Comparative Example 3 | O | 1–2 | 3 |
| Comparative Example 4 | O | 3–4 | 1–2 |

TEST METHOD (1) Exhaustion property

After the dyeing was over, the exhausted bath was visually observed.

O: Little residues

X: Many residues (2) Light fastness

The dyed product was backed with urethane foam, exposed to a fade meter (temperature of a black pannel 83° C.) for 300 hours, and then judged using a grey scale for assessing change in color.

(3) Sublimation fastness

According to JIS L 0879-1968, the dyed product was treated at 185° C. for 30 seconds together with undyed polyester cloth for assessing staining.

Moreover, using the same yellow disperse dye composition as in Example 1 and the yellow disperse dyes which are known to have a practical exhaustion property and the same as in Comparative Examples 1, 3 and 4, as a yellow component, C.I. Disperse Red 191 (Sumikaron Brilliant Pink SE-RL, commercially available, manufactured by Sumitomo Chemical Co.) as a red component, and C.I. Disperse Blue 54 (Sumikaron Blue S-2GL, commercially available, manufactured by the same company as above) as a blue component, in a mixing ratio as shown in Table 2, a blend dyeing was carried out in the same manner as in Example 1 to obtain each dyed product of a grey color. The dyed product was subjected to heat-set treatment at 175° C. for 5 minutes, and then judged for the change in color using a JIS grey scale for assessing the change. Table 2 demonstrates that the dye composition in Example 1 is extremely superior in the thermal resistance to the dyes in Comparative Examples 1, 3 and 4, which are known to have a practical exhaustion property.

TABLE 2

|  | Blending recipe % o.w.f. | | | Change in color by heat-set treatment (grade) |
| --- | --- | --- | --- | --- |
|  | Yellow component | Red component | Blue component |  |
| Example 1 | 0.15 | 0.9 | 0.6 | 4 |
| Comparative Example 1 | 0.15 | 0.9 | 0.6 | 2 |
| Comparative Example 3 | 0.15 | 0.9 | 0.6 | 2–3 |
| Comparative Example 4 | 0.15 | 0.9 | 0.6 | 2 |

EXAMPLES 2 to 7

The dye of the formula (1) and the dye of the formula (2) used in Example 1 were mixed in each mixing weight ratio as shown in Table 3 to obtain each yellow disperse dye composition. Each dye composition exhibited an excellent exhaustion property and gave each dyed product excellent in light fastness and thermal resistance.

TABLE 3

| Example No. | Mixing weight ratio | | Exhaustion property | Light fastness (grade) | Sublimation fastness (grade) |
| --- | --- | --- | --- | --- | --- |
|  | Dye (1) | Dye (2) |  |  |  |
| 2 | 80 | 20 | O | 3–4 | 3–4 |
| 3 | 70 | 30 | O | 3–4 | 3–4 |
| 4 | 60 | 40 | O | 3–4 | 3–4 |
| 5 | 40 | 60 | O | 3–4 | 3–4 |
| 6 | 20 | 80 | O | 3 | 3 |
| 7 | 95 | 5 | O–Δ | 3–4 | 3–4 |
| Comparative 5 | 10 | 90 | O | 2–3 | 2–3 |

EXAMPLES 8 to 11

Example 1 was repeated, provided that each dye as shown in Table 4 was used in place of the dye of the formula (2). Each dye composition obtained exhibited an excellent exhaustion property and gave each dyed product excellent in light fastness and thermal resistance.

TABLE 4

| Example No. | Dye used in place of the dye (2) | Exhaustion property | Light fastness (grade) | Sublimation fastness (grade) |
| --- | --- | --- | --- | --- |
| 8 | | 0 | 3-4 | 3-4 |
| 9 | | 0 | 3-4 | 3-4 |
| 10 | | 0 | 3-4 | 3-4 |
| 11 | | 0 | 3-4 | 3-4 |

What is claimed is:

1. A water-insoluble disperse dye composition comprising a combination of a dye represented by the following formula (I),

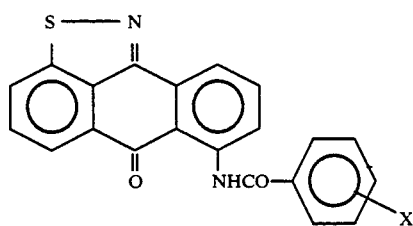

(I)

wherein X is hydrogen, halogen, $C_1$-$C_4$ alkyl or $C_1$-$C_4$ alkoxy, in an amount of 95 to 20% by weight, and a dye represented by the following formula (II),

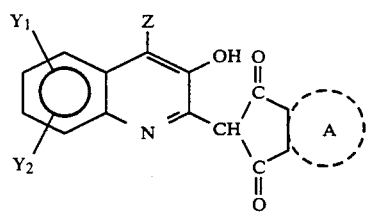

(II)

wherein Z, $Y_1$ and $Y_2$ are independently hydrogen or halogen, and the ring A is a benzene or naphthalene ring unsubstituted or substituted with a carboxylic acid ester group, in an amount of 5 to 80% by weight.

2. The dye composition according to claim 1, wherein the dye represented by the formula (I) is a dye of the following formula,

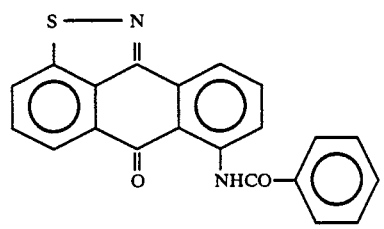

of the following formula,

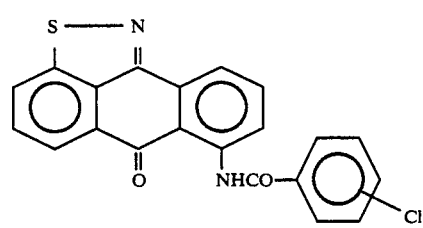

or of the following formula,

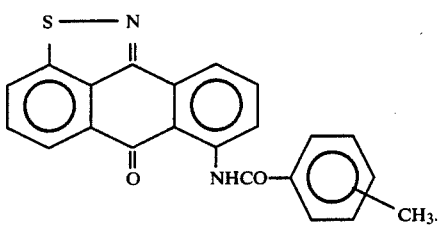

3. The dye composition according to claim 1, wherein the dye represented by the formula (II) is a dye of the following formula,

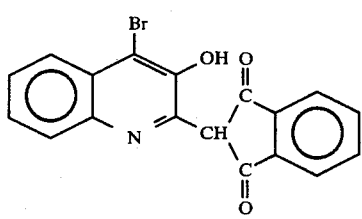

of the following formula,

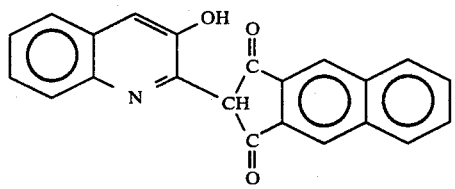

of the following formula,

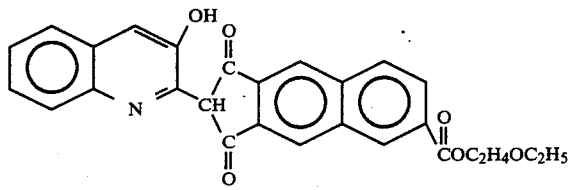

of the following formula,

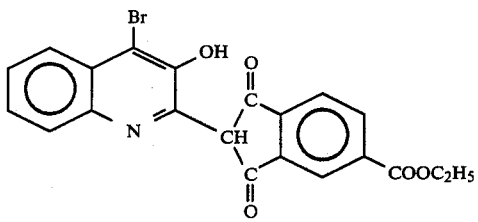

or of the following formula,

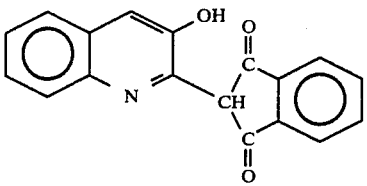

4. The dye composition according to claim 1, wherein the dye represented by the formula (I) is a dye of the following formula,

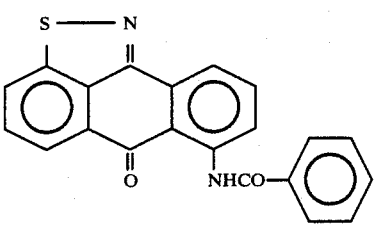

and the dye represented by the formula (II) is a dye of the following formula,

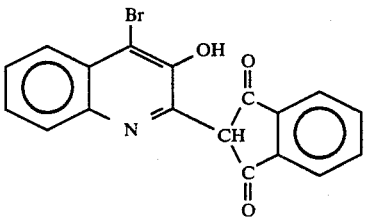

5. A method for dyeing polyester fiber materials, which comprises using a water-insoluble disperse dye composition comprising a combination of a dye represented by the following formula (I),

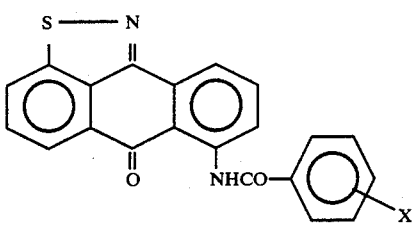

wherein X is hydrogen, halogen, lower alkyl or lower alkoxy, in an amount of 95 to 20% by weight, and a dye represented by the following formula (II),

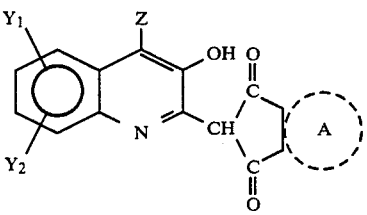

wherein Z, $Y_1$ and $Y_2$ are independently hydrogen or halogen, and the ring A is a benzene or naphthalene ring unsubstituted or substituted with a carboxylic acid ester group, in an amount of 5 to 80% by weight.

* * * * *